United States Patent
Clendenen et al.

[11] Patent Number: 5,877,953
[45] Date of Patent: Mar. 2, 1999

[54] TIME TRACKING APPARATUS

[75] Inventors: David B. Clendenen, Auburn; Teresa D. Cornell, Shingle Springs; Kyle D. Fields, El Dorado Hills; George E. McLam, Sacramento, all of Calif.

[73] Assignee: Stratos Industries, Inc., Shingle Springs, Calif.

[21] Appl. No.: 956,921

[22] Filed: Oct. 23, 1997

Related U.S. Application Data

[63] Continuation of Ser. No. 485,601, Jun. 7, 1995, abandoned.

[51] Int. Cl.[6] .............................. G05B 11/01; G06F 03/00
[52] U.S. Cl. .................. 364/146; 364/709.4; 364/710.04
[58] Field of Search ...................................... 364/140–146, 364/401, 406, 709.04, 710.04, 715.01, 705.02, 705.06; 395/232, 233, 234

[56] References Cited

U.S. PATENT DOCUMENTS

| | | | |
|---|---|---|---|
| 3,648,243 | 3/1972 | Wiggins | 340/825.55 |
| 3,725,947 | 4/1973 | Albertini et al. | 346/33 R |
| 3,781,529 | 12/1973 | Abramson et al. | 377/5 |
| 3,808,372 | 4/1974 | Sielsch | 379/68 |
| 3,889,103 | 6/1975 | Russell et al. | 235/433 |
| 3,911,446 | 10/1975 | Albertini | 379/114 |
| 3,922,531 | 11/1975 | Willmann et al. | 377/13 |
| 3,943,526 | 3/1976 | Albertini et al. | 346/33 R |
| 4,025,774 | 5/1977 | Johnson et al. | 702/178 |
| 4,035,627 | 7/1977 | Dickinson et al. | 364/706 |
| 4,065,663 | 12/1977 | Edwards, II | 705/418 |
| 4,115,870 | 9/1978 | Lowell | 379/93.17 |
| 4,164,038 | 8/1979 | Nachtigal | 705/32 |
| 4,195,220 | 3/1980 | Bristol et al. | 377/13 |
| 4,283,769 | 8/1981 | Asada | 364/710.13 |
| 4,340,808 | 7/1982 | Donohoo | 235/92 AC |
| 4,358,777 | 11/1982 | Billie | 346/87 |
| 4,460,965 | 7/1984 | Trehn et al. | 705/418 |
| 4,536,646 | 8/1985 | Adams et al. | 235/377 |
| 4,549,264 | 10/1985 | Carroll et al. | 705/32 |
| 4,625,276 | 11/1986 | Benton et al. | 705/44 |
| 4,710,616 | 12/1987 | Utley | 235/472 |
| 4,852,000 | 7/1989 | Webb et al. | 705/30 |
| 4,853,852 | 8/1989 | Rosen | 705/10 |
| 4,866,611 | 9/1989 | Cree et al. | 364/705.08 |
| 4,891,776 | 1/1990 | Kuroki et al. | 364/705.07 |
| 4,905,186 | 2/1990 | Fukui | 705/39 |
| 4,961,158 | 10/1990 | Sussman | 364/709.04 |
| 4,977,520 | 12/1990 | McGaughey, III et al. | 345/330 |
| 5,007,015 | 4/1991 | Yokozawa | 395/651 |
| 5,021,952 | 6/1991 | Nishimura et al. | 705/30 |
| 5,068,787 | 11/1991 | Pipella et al. | 705/32 |
| 5,093,813 | 3/1992 | Levine | 368/10 |
| 5,142,486 | 8/1992 | Guntharp, Jr. et al. | 364/709.04 |
| 5,155,659 | 10/1992 | Kunert | 361/683 |
| 5,159,180 | 10/1992 | Feiler | 235/375 |
| 5,229,584 | 7/1993 | Erickson | 235/375 |
| 5,261,045 | 11/1993 | Scully et al. | 345/329 |
| 5,267,147 | 11/1993 | Harshaw et al. | 705/32 |
| 5,493,492 | 2/1996 | Cramer et al. | 705/32 |

*Primary Examiner*—Reba I. Elmore
*Assistant Examiner*—Thomas E. Brown
*Attorney, Agent, or Firm*—John P. O'Banion

[57] ABSTRACT

A handheld apparatus for tracking, recording and retrieving time by account, task and date. The device permits entry of one or more account numbers and one or more tasks associated with each account number. When working on an activity for a selected account and task, a "timer" can be started for that account's activity and the device will keep track of total accumulated time. Recorded data can be retrieved on the internal display or transferred to a computer for processing.

8 Claims, 7 Drawing Sheets

TIME TRACKING APPARATUS

CROSS-REFERENCE TO RELATED APPLICATIONS

This application is continuation of application Ser. No 08/485,601 filed Jun. 7, 1995 now abandoned.

BACKGROUND OF THE INVENTION

1. Field of the Invention

This invention pertains generally to time keeping devices, and more particularly to an apparatus for logging, tracking and processing the amount of time spent on projects.

2. Description of the Background Art

Clocks, watches and other timekeeping devices are well known and widely used. Further, many individuals and businesses determine how much to charge their clients or customers based on the amount of time spent on a particular project. This often requires the recording of start and stop times during periods of activity, computation of elapsed time during each period of activity or a total elapsed time for all periods of activity, and application of a billing rate or other billing factor to the total elapsed time. As an alternative to recording start and stop times and computing an elapsed time from that information, it is also known to use timers or other devices to record and display total elapsed time. Further, it is known to record, track and process the information either manually or by using electronic data processors.

Examples of devices which have been previously developed for timekeeping purposes include those found in U.S. Pat. No. 4,164,038, which discloses a hand held calculator with memory designed to store time to keep accounting of billable hours; U.S. Pat. Nos. 4,905,186; 4,115,870 and 5,007,015 which disclose portable data terminals that can store data for later downloading; U.S. Pat. No. 5,068,787 which discloses a portable device for tracking elapsed time by job, department or account number, and which provides for downloading the data; U.S. Pat. No. 4,195,220 which discloses a device which permits the recording of elapsed time associated with a number of tasks, and provides information for billing; and U.S. Pat. No. 4,164,038 which discloses a combination calculator/time recording device and teaches that elapsed time may be determined by using a counter or subtracting start and stop times to obtain a difference signal.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

By way of example, and not of limitation, the invention comprises a handheld time and activity recording and retrieval device. The device permits entry of one or more account numbers and one or more tasks associated with each account number. When working on an activity for a particular client, a "timer" can be started for that client's activity and the device will keep track of total accumulated time. Information is stored in memory and can be later downloaded into a computer for processing. The device also has a review mode where you can call up information stored for display or editing.

The invention includes a microprocessor which is interfaced to a keypad, a liquid crystal display, and a bidirectional serial data interface. The keypad includes a SCROLL key, SELECT key, ACCT key, NEXT key, DATE key, and REVIEW key. Each of these keys is used for data entry and/or retrieval. The device also includes a timer switch for activating and deactivating the timer, and a reminder switch for activating and deactivating an annunciator which sounds every fifteen minutes while the timer is operating. The liquid crystal display provides a visual indication of a plurality of data fields, for data entry and review.

The invention provides a means for tracking time data by account, task and date. Data for multiple accounts and tasks can be stored for later retrieval. Once an account and task is accessed, the device displays can record and display elapsed time for later review. The review mode permits the user to display or edit data which has been stored in memory. Accounts and tasks can be easily scrolled through for review.

An object of the invention is to permit a user to track the amount of time spend on a task.

Another object of the invention is to permit a user to track multiple clients and projects.

Another object of the invention is to reduce timekeeping errors by eliminating the need to rely on memory.

Another object of the invention is to automatically compute timesheet entries.

Another object of the invention is to increase productivity.

Another object of the invention is to increase billable hours.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is generally shown in FIG. 1 through FIG. 11. It will be appreciated that the apparatus may vary as to configuration and as to details of the parts without departing from the basic concepts as disclosed herein.

Figure 1:
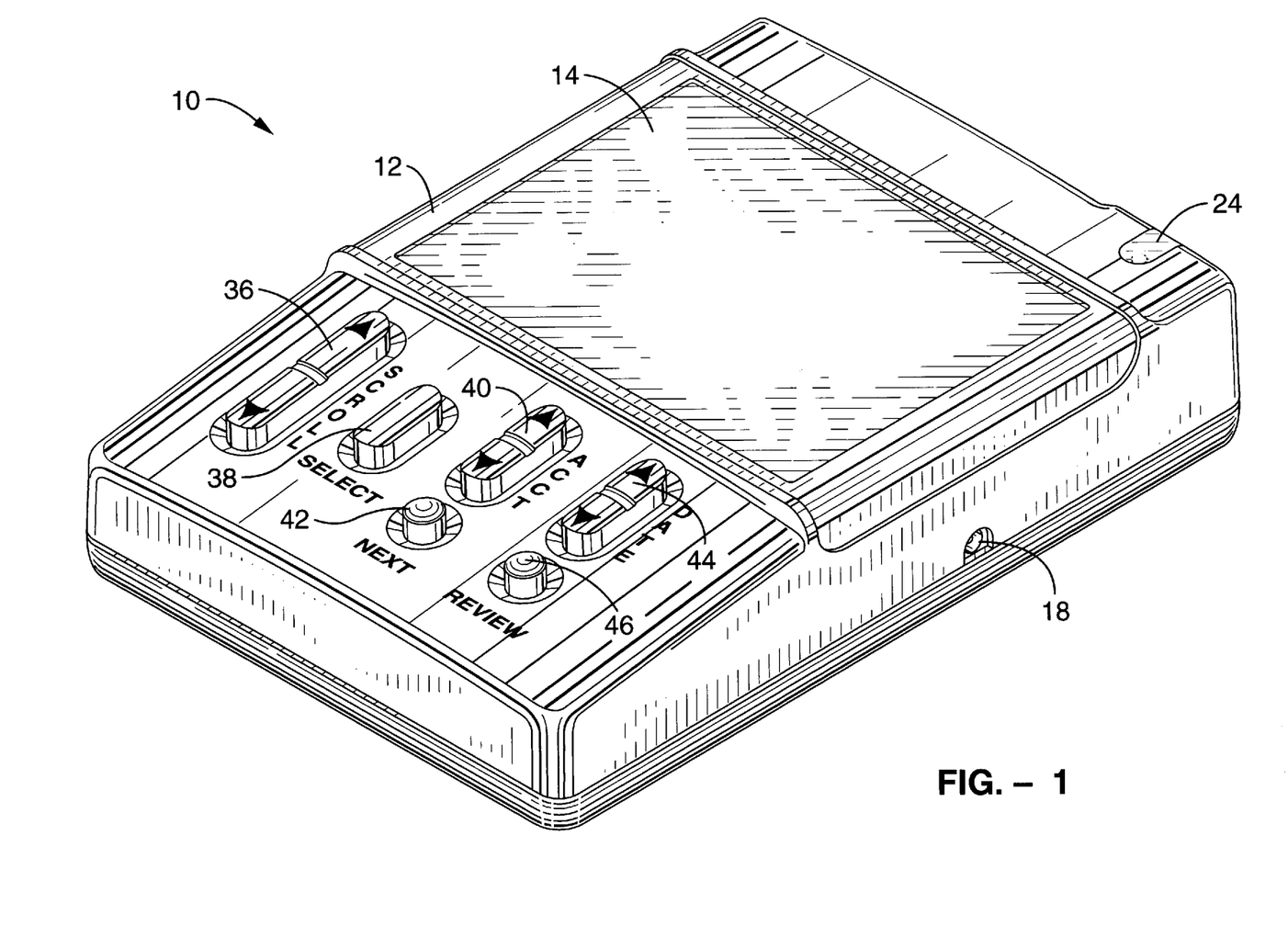
FIG. 1 is a perspective view of a time tracking apparatus in accordance with the present invention.
Figure 2:
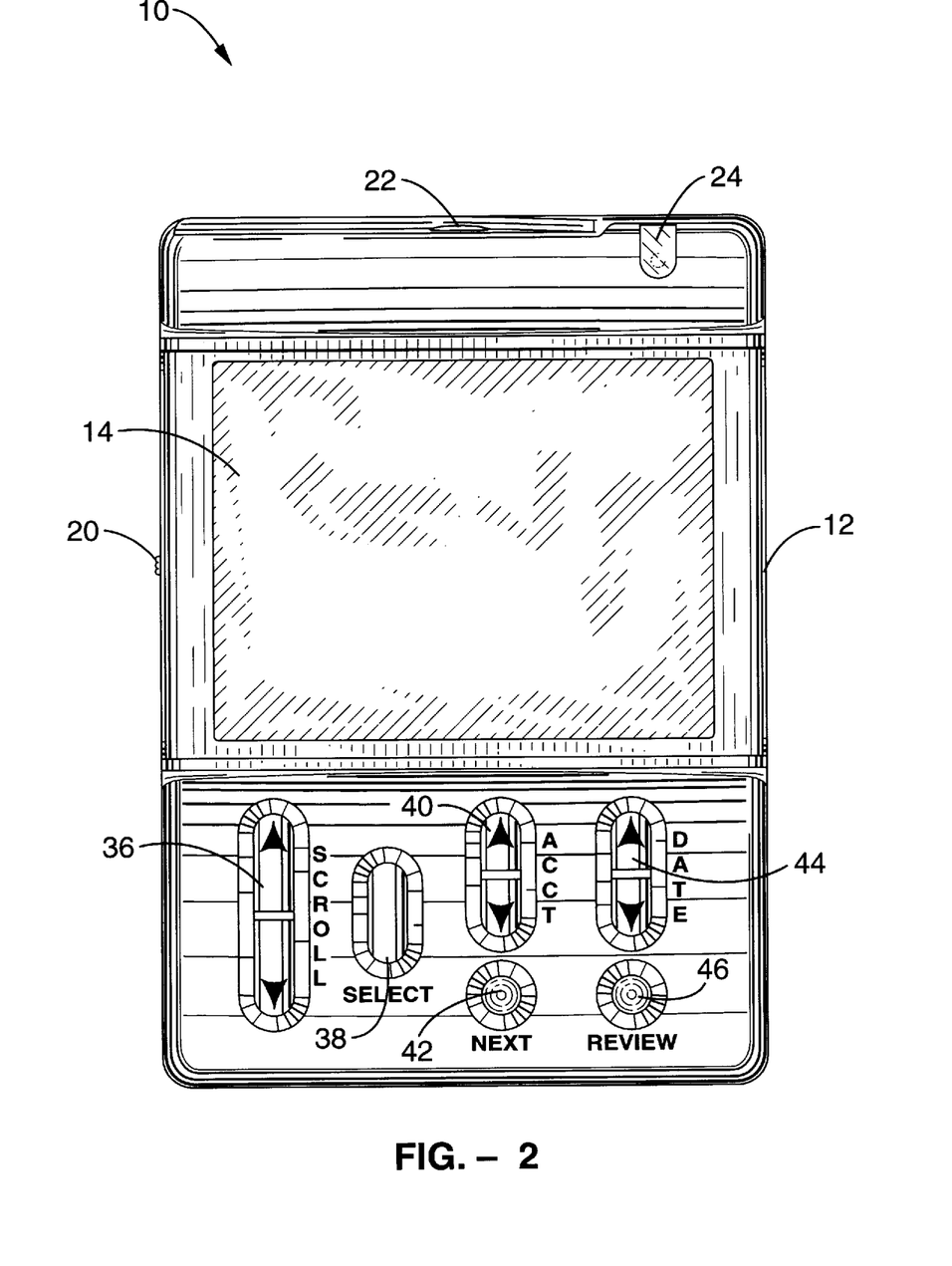
FIG. 2 is a front view of the apparatus shown in FIG. 1.
Figure 3:
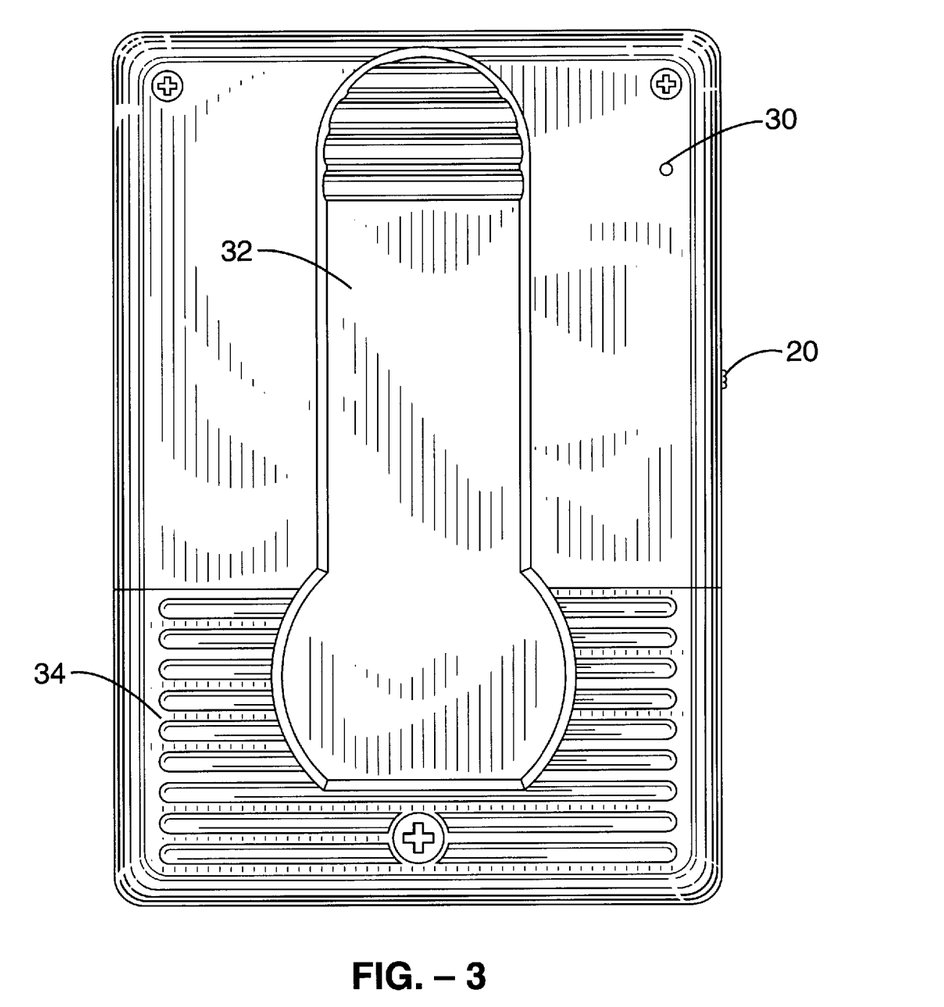
FIG. 3 is a rear view of the apparatus shown in FIG. 1.
Figure 4:
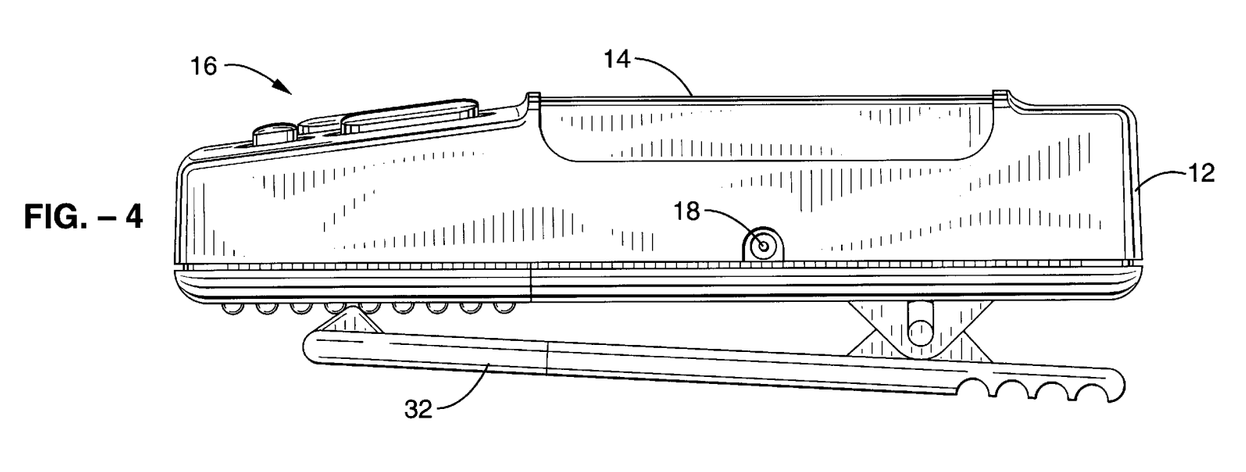
FIG. 4 is a left side view of the apparatus shown in FIG. 1.
Figure 5:
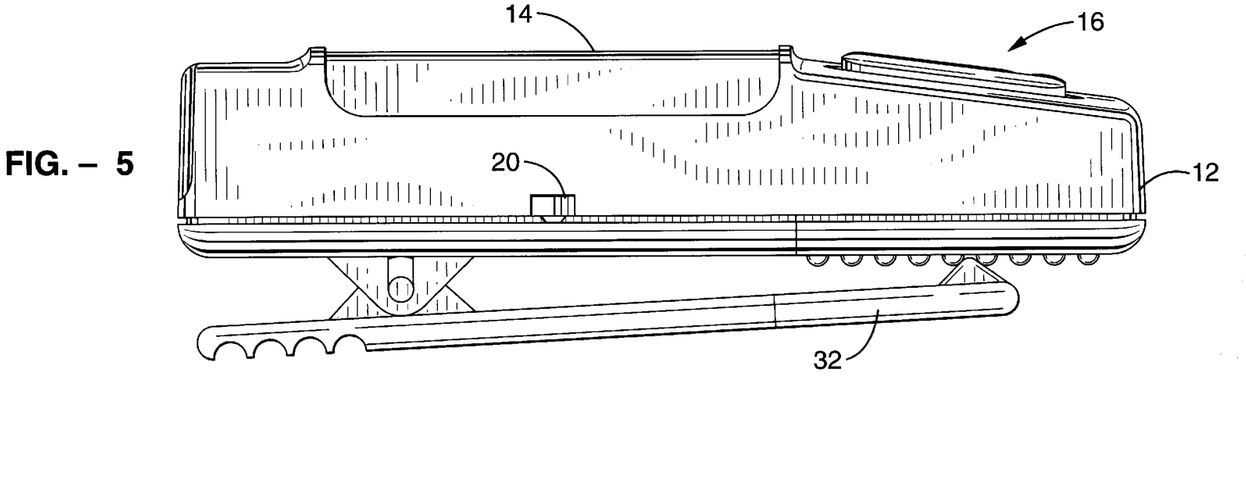
FIG. 5 is a right side view of the apparatus shown in FIG. 1.
Figure 6:
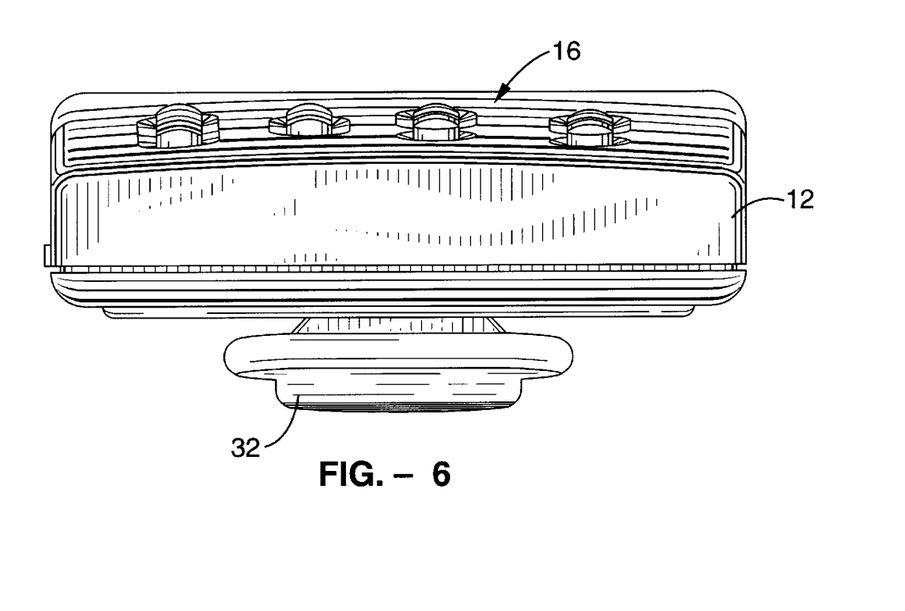
FIG. 6 is a bottom view of the apparatus shown in FIG. 1.
Figure 7:
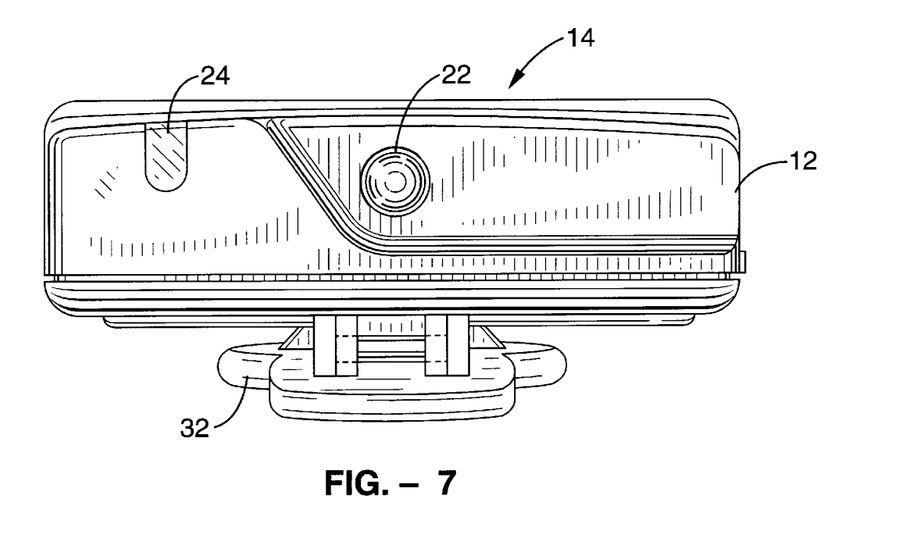
FIG. 7 is a top view of the apparatus shown in FIG. 1.

Referring first to FIG. 1 through FIG. 7, a time tracking apparatus 10 is shown in accordance with the present invention. The apparatus, which is self-contained and battery powered, includes a housing 12 for containing the internal components and battery, a liquid crystal display 14, and a multi-function keypad 16. A serial data jack 18 is located on one side of the apparatus, and a slide-type reminder switch 20 is located on the opposite side of the apparatus. Located at the top of the apparatus is a momentary contact timer switch 22, and overlapping the front and top of the apparatus is an indicator light 24. The apparatus also includes an annunciator 26, which is internal to the device and depicted in the block diagram of FIG. 8. The apparatus also includes a momentary contact setup switch 28 which is internal to the device and which is depicted in the block diagram of FIG. 8. Setup switch 28 is accessible through an access hole 30 in the back of the apparatus as shown in FIG. 3. For convenience to the user, the device is sized as a handheld unit, and includes a spring loaded belt clip 32 on the back side. The battery which powers the apparatus is accessible through a removable cover plate 34, also located on the back side.

As indicated above, the apparatus includes a multi-function keypad 16. Keypad 16 includes the following momentary contact control switches, which are used to enter data into and retrieve data from the apparatus: SCROLL key 36, SELECT key 38, ACCT key 40, NEXT key 42, DATE key 44, and REVIEW key 46. These controls, in combination with reminder switch 20 and timer switch 22, provide for operation of the apparatus. Note also that SCROLL key 36, ACCT key 40 and DATE key 44 each operate an "up" switch and a "down" switch for moving through sequential data fields in both directions.

Figure 8:
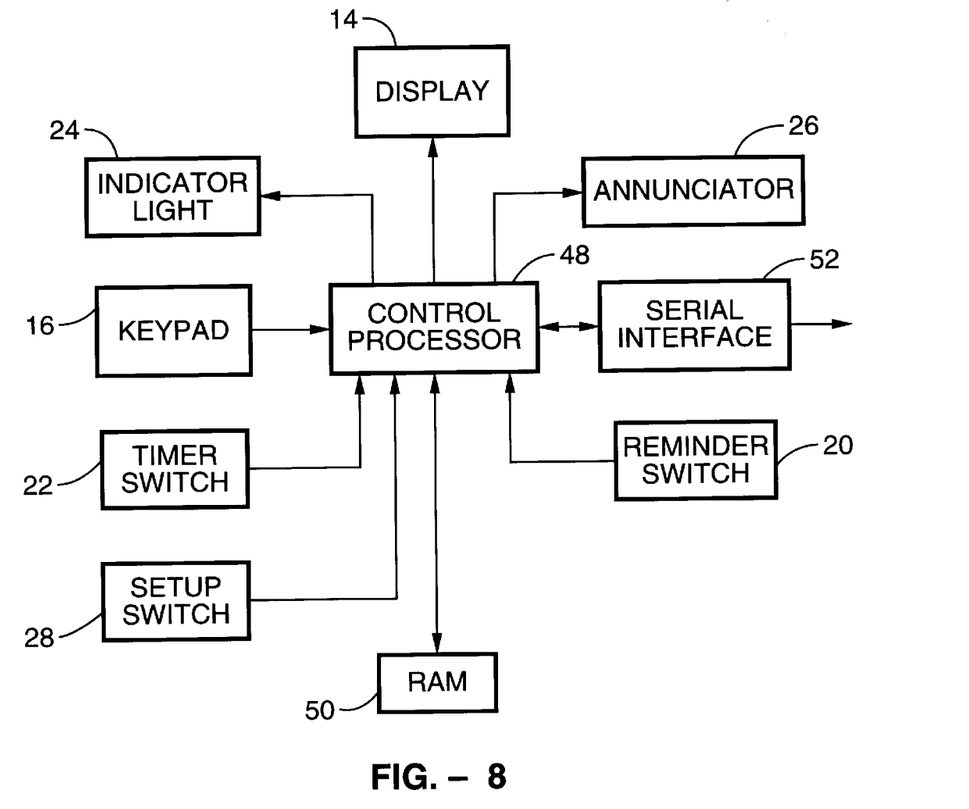
FIG. 8 is functional block diagram of a time tracking apparatus in accordance with the present invention.

Referring now to FIG. 8, the apparatus is preferably microprocessor controlled, although those skilled in the art will appreciate that analogous circuitry could be provided in either analog or digital form. FIG. 8 depicts the apparatus 10 of the present invention in functional block diagram form and, as indicated previously, is controlled by a microprocessor 48. Microprocessor 48 can be an SMOS SMC 6246 or the like, which is a 4-bit processor having internal memory for program storage. For data storage, microprocessor 48 is connected to random access memory 50, such as a SONY CXK58257AM or the like which is a 32k static RAM device. For data transfers to and from the apparatus, a bidirectional serial interface 52 is provided. Serial interface 52 is typically an Analog Devices ADM561 or the like. Also shown connected to microprocessor 48 are liquid crystal display 14, keypad 16, reminder switch 20, timer switch 22, indicator light 24, annunciator 26, and setup switch 28. It will be appreciated that, while not shown in FIG. 8, serial data jack 18 would be connected to serial interface 52.

Figure 9:
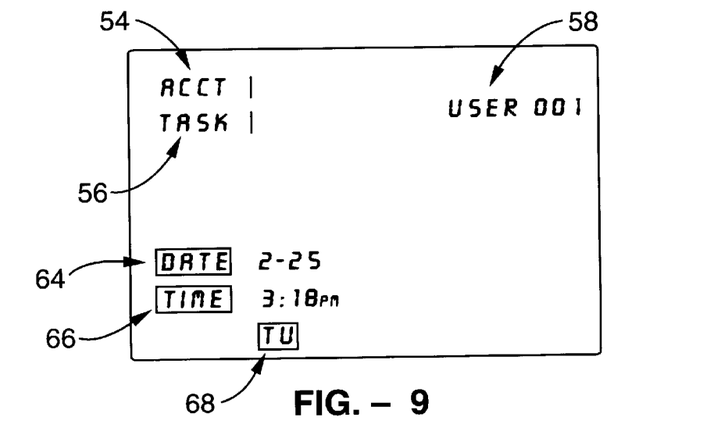
FIG. 9 is a diagrammatic view of the display portion of the apparatus of the present invention showing typical data displayed when the timer is not operating.
Figure 10:
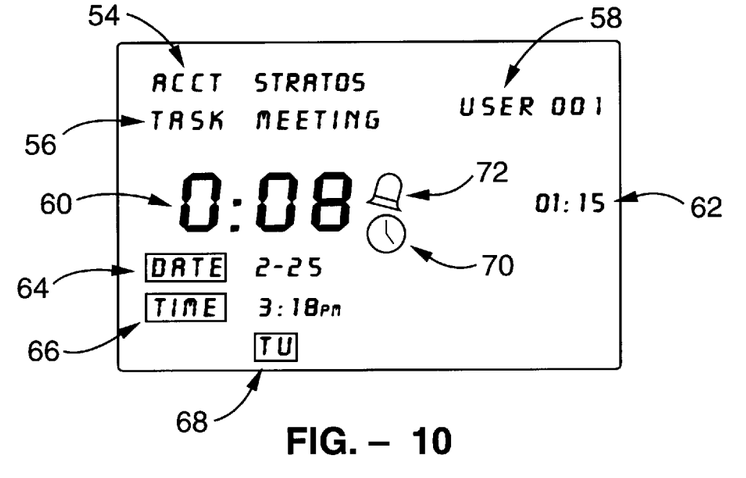
FIG. 10 is a diagrammatic view of the display portion of the apparatus of the present invention showing typical data displayed when the timer is operating.

Referring now to FIG. 9 and FIG. 10, liquid crystal display 14 provides a plurality of visual data fields to the user. An "ACCT" field 54 provides a visual indication of up to one hundred account numbers as can be seen in FIG. 9 or, alternatively, the account numbers can be replaced with an alphanumeric indication of account names up to fifteen characters in length as shown in FIG. 10. A "TASK" field 56 similarly provides a visual indication of up to one-hundred task numbers as can be seen in FIG. 9 or, as can be seen in FIG. 10, the task numbers can be replaced with an alphanumeric indication of task names up to eleven characters in length.

The "USER" field 58 provides an identifier of the user of the apparatus, in the form of a three digit code. This code can be used to keep track of each apparatus by a particular user for purposes of data organization. An elapsed time field 60 provides a visual indication of the elapsed time recorded on the currently selected account, task and date, and shows hours and minutes. Similarly, the total elapsed time field 62 provides a vidual indication of the total elapsed time recorded on the currently selected account.

The date 64, time 66 and day 68 fields provide the user with a visual indication of the current date, current time and current day of the week, respectively. A clock icon 70 provides the user with a vidual indication that the timer has been activated by depressing timer switch 22, and a bell icon 72 provides a visual indication that the reminder switch 20 has been activated to provide a tone every fifteen minutes through annunciator 26 as an audible reminder that the timer has been activated. Not shown in FIG. 9 or FIG. 10, but provided as additional visual indications on display 14 when appropriate are a "DN LOAD" indicator to show that a serial cable is plugged into serial data jack 18, a "LOW BAT" indicator to provide a low battery warning, a "REVIEW" indicator to provide an indication that the apparatus is in review mode as opposed to data entry mode, and a "FULL" indicator to show that the apparatus is full of timing transaction records; that is, the memory is full.

In operation, the apparatus tracks time by account, task and date, and four operating modes are provided: setup, normal, review, and download. When the apparatus is not being operated in any of the "special" modes (setup, review or download), it is in normal mode for tracking time. In the normal mode, the currently selected account and task are shown on display 14 in the ACCT 54 and TASK 56 displays, respectively. The current date, time, day of the week and user number are also shown in the DATE 64, TIME 66, day of the week 68, and USER 58 fields, respectively.

1. SETUP MODE

The setup mode provides for adjustment of the contrast of liquid crystal display 14, entry of account and task names, and setting the date, time, day, and the user number. The setup mode is activated by depressing setup switch 28 through access hole 20. When setup mode if first entered, the words "CONTRAST ADJUST" will be displayed on liquid crystal display 14. The upper portion of the SCROLL key 36 is depressed to increase the contrast, whereas the lower portion is depressed to decrease the contrast. When the contrast is set to the desired level, the user depresses the SELECT key 38. A blinking "ACCT" prompt will be displayed and the first character of the first account name will begin to blink. To add accounts, the user presses the upper portion of the ACCT key 40 and scrolls to the desired account number.

Alternatively, account names can be used to identify clients, projects, or both. An example of a client might be STRATOS, and a project might be abbreviated MEETING as shown in FIG. 10. While the ACCT number is blinking, an account is selected with the ACCT key 40. To change the name of the account to something other than a number, the character that is blinking is altered by pressing the upper or lower portion of the SCROLL key 36 to view up and down a character selection set which comprises the entire alphabet, the numbers 0–9 and several symbols. When a desired letter, number or character has been selected, the user presses the NEXT key 42 to advance a cursor one position to the right. This process is repeated for each character until the name of the account is completed. Once completed, the new name will replace the default number that was previously in its place. To select another account for naming, the user depresses the ACCT key 40 and continues the process. When all accounts have been named as desired, the user depresses the SELECT key 38 and can now edit task names.

Task names can be used to identify specific tasks which might be charged out at different rates for the same client, or simply to track time spent on different tasks. The same task names are shared by all of the accounts. If the user desires to add to the number of tasks or edit the numbers, the same procedure described above with regard to account names is used. When the user is finished adding to or changing tasks, the user again presses the SELECT key 38 which allows entry of the date, time, day of week and user number.

The date, the time, the day of the week and the user number are set by pressing the upper or lower portions of the SCROLL key 26 to increment and decrement the selected numbers. The cursor is advanced to the next character in the date and time with the NEXT key 42, and the date and time are accepted by pressing the SELECT key 38. This then allows the user to press the upper and lower portions of the SCROLL key 36 to find the day of the week, and the day of the week is accepted by depressing the SELECT key 38. The user number can then be set if desired using the SCROLL key 36; otherwise, by depressing the SELECT key 38 the user can exit the setup mode and enter the normal mode.

2. NORMAL MODE

As indicated previously, when the apparatus is not being operated in any of the "special" modes (setup, review or download), it is in the normal mode. When it is desired to time an activity, the user scrolls to the account name to be timed using the SCROLL key 36. If the user desires to also keep track of a particular task, the user depresses the SELECT key 38 and the word TASK will begin to blink in the task display 56. The user can then depress the upper or lower portion of the SCROLL key 36 to select the desired task name.

Once the desired account and task are selected, the user starts the timer by pressing the timer switch 22. The indicator light 24 will then blink green once to confirm that the timer has been started, and the clock icon 70 will appear on display 14. The elapsed time will be displayed in hours and minutes, and will increment only when the system clock increments each minute, so the display will read 0:00 for up to 59 seconds before "rolling over" to 0:01.

To stop the timer, the user presses timer switch 22 again. The indicator light 24 will blink red once to confirm that the timer has been stopped, and the clock icon 70 will disappear. The elapsed time display 60 will continue to display the elapsed time until the user starts to select another account or task.

Note that each time the user activates the timer under a unique combination of account, task, and date, a new timing transaction is being stored in memory, even if the display reads 0:00 for the recorded time.

3. REVIEW MODE

To review logged time, the user presses the REVIEW key 46. The words REVIEW will appear in display 14 along with the first account identifier. The time can then be reviewed by either account or by date. To exit the review mode at any time, the user presses the REVIEW key 46 again.

To review time by account, the user presses the upper or lower portion of the ACCT key 40 to locate the first account to review. Once the account is displayed, the user presses the NEXT key 42 to display each consecutive date on which that account was clocked. The main time readout (elapsed time display) 60 will display the daily total. The total elapsed time field 62 will displays the cumulative total for the account, and updates each time the NEXT key 42 is pressed to advance to the next date. When the user has reached the last record for that particular account, an "END OF DATA" message will appear on display 14, along with the account name and its final, cumulative total.

The ACCT key 40 can be pressed again to select another account for review. The first time that the control is pressed, the user will be returned to the last account selected. Pressing the ACCT key 40 will select another account for review, and the process can be repeated for as many accounts as desired.

To review time by date, the user presses the DATE key 44 to select a date for review. Thereafter, pressing the NEXT key 42 will display each account timed for that day until and "END OF DATA" message appears on display 14 and that day's total is displayed. This process can be repeated for as many dates as desired.

While the apparatus is in the review mode, the user can edit the stored information in a number of ways. The user can change the amount of time logged under a given record, move a record from one date to another, or move the time from one account name to another. In this regard, the user can change any of the variables associated with the timing event by editing any field on the display while in the review mode. For example, the user could change the amount of time recorded under account IBM*PROJ-1 from 12:07 on 9-16 (Fr) to 11:23. Or, the user could move this time from 9-16 to 10-21 by editing the date. Moreover, the user could change the task name from PREDESIGN to PHASE-1, or change the account name from IBM*PROJ-1 to IBM*PROJ-2.

While in the review mode, the user can find the desired account for editing by pressing either the ACCT key 40 or DATE key 44 in conjunction with the NEXT key 42 to locate a particular timing record for editing. Then, the user presses the SELECT key 38 until the field that is to be edited begins to blink. This field may be either the account name, task name, the time logged, the date, or the day of the week. The user then presses the upper or lower portion of the SCROLL key 36 to select a different value for that field. Unlike in the setup mode, pressing the NEXT key 42 in the review mode does not move the cursor from character to character within any given field, but advances to the next transaction entirely.

When the user is finished editing the field, the SELECT key 38 is pressed to enter the changes to that field and move on to the next field that will be edited. Once editing of the time record is complete, the user can either press the ACCT key 40, DATE key 44 or NEXT key 42 to select another account for editing, or exit the review mode by pressing the REVIEW key 46.

To clear a time record from the apparatus, while in the review mode the user holds down the timer switch 22 and presses the NEXT key 42. To clear all time records, account and task data from the apparatus, the user holds down the timer switch 22 and presses the upper portion of the ACCT key 40.

4. DATA TRANSFER MODE

When a serial interface cable is plugged into serial data jack 18, the apparatus automatically switches to the data transfer mode. This mode allows for both the uploading and downloading of information to compatible data transfer software. Unplugging the cable returns the apparatus to the normal mode. Further, the information contained in the apparatus can be printed by plugging the serial interface cable directly into a line printer operating at 300 baud. Refer to your printer manual for the proper dip switch settings. When the connection is made, the user presses the timer switch 22 and the data will be sent directly to the printer.

5. ADDITIONAL FEATURES (a) Lock. If desired, the user can lock the controls and hide the display by pressing the upper and lower portions of the SCROLL key 36 simultaneously. If the timer is running at that time, only the clock icon 70 will remain on the display 14. While the display 14 is blanked, none of the controls, including timer switch 22, will operate unless the display 14 is reactivated.

(b) Reminder Tone. By activating the reminder switch 20, a tone will be emitted from annunciator 26 every fifteen minutes as a reminder that the timer is operating. When activated, the bell icon 72 appears in display 14.

(c) Low Battery Warning. When the batteries are running low, a "LOW BAT" icon will appear in display 14.

Accordingly, it will be seen that this invention provides for a handheld device for tracking time by account, task and date. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A handheld time tracking apparatus, comprising:

(a) keypad means for entering and retrieving data;

(b) display means for displaying entered and retrieved data;

(c) memory means for storing data;

(d) control processor means for tracking time data by account, task and date, said control processor means including normal mode means for tracking and storing time data and review mode means for reviewing tracked and stored time data, said control processor means operatively connected to said keypad means and said display means;

(e) switchable reminder means for audibly indicating, at uniform periodic time intervals, operation of said apparatus in a timing mode;

(f) display blanking means for preventing data from being displayed on said display means without disabling functionality of said apparatus except for said display means, and wherein a visual indication of operation of said apparatus in a timing mode is displayed during operation of said display blanking means: and (g) keypad locking means for disabling said keypad means without disabling functionality of said apparatus except for said keypad means and said display means, and wherein a visual indication of operation of said apparatus in a timing mode can be still displayed on said display means.

2. An apparatus as recited in claim 1, further comprising visual indicator means for visually indicating in a first color that said apparatus has started a timing mode and for visually indicating in a second color that said apparatus has ended said timing mode.

3. An apparatus as recited in claim 1, further comprising means for simultaneously displaying elapsed time for an event being timed in connection with an account and total elapsed time for said account.

4. A handheld time tracking apparatus, comprising:

(a) keypad means for entering and retrieving data;

(b) display means for displaying entered and retrieved data;

(c) memory means for storing data;

(d) control processor means for tracking time data by account, task and date, said control processor means including normal mode means for tracking and storing time data and review mode means for reviewing tracked and stored time data, said control processor means operatively connected to said keypad means and said display means;

(e) means for entering and displaying a user identification code associated with said apparatus;

(f) keypad locking means for disabling said keypad means without disabling functionality of said apparatus except for said keypad means and said display means, and wherein a visual indication of operation of said apparatus in a timing mode can be still displayed on said display means;

(g) display blanking means for preventing data from being displayed on said display means without disabling functionality of said apparatus except for said display means, and wherein a visual indication of operation of said apparatus in a timing mode is displayed during operation of said display blanking means; and (h) visual indicator means for visually indicating in a first color that said control processor has started a timing mode and for visually indicating in a second color that said apparatus has ended said timing mode.

5. An apparatus as recited in claim 4, further comprising switchable reminder means for audibly indicating, at uniform periodic time intervals, operation of said apparatus in a timing mode.

6. An apparatus as recited in claim 4, further comprising means for simultaneously displaying elapsed time for an event being timed in connection with an account and total elapsed time for said account.

7. A handheld time tracking apparatus, comprising:

(a) keypad means for entering and retrieving data;

(b) display means for displaying entered and retrieved data;

(c) memory means for storing data;

(d) control processor means for tracking time data by account, task and date, said control processor means including normal mode means for tracking and storing time data and review mode means for reviewing tracked and stored time data, said control processor means operatively connected to said keypad means and said display means;

(e) switchable reminder means for audibly indicating, at uniform periodic time intervals, operation of said apparatus in a timing mode;

(f) means for entering and displaying a user identification code associated with said apparatus;

(g) visual indicator means for visually indicating in a first color that said apparatus has started a timing mode and for visually indicating in a second color that said apparatus has ended said timing mode;

(h) keypad locking means for disabling said keypad means without disabling functionality of said apparatus except for said keypad means and said display means, and wherein a visual indication of operation of said apparatus in a timing mode can be still displayed on said display means; and (i) display blanking means for preventing data from being displayed on said display means without disabling functionality of said apparatus except for said display means, and wherein a visual indication of operation of said apparatus operating in a timing mode is displayed during operation of said display blanking means.

8. An apparatus as recited in claim 7, further comprising means for simultaneously displaying elapsed time for an event being timed in connection with an account and total elapsed time for said account.

* * * * *